(12) United States Patent
Vajravel et al.

(10) Patent No.: US 11,531,478 B1
(45) Date of Patent: Dec. 20, 2022

(54) OPTIMIZING MEMORY USAGE TO ENABLE LARGER-SIZED DEPLOYMENTS AND CLIENT SERVICING

(71) Applicant: Dell Products L.P., Round Rock, TX (US)

(72) Inventors: Gokul Thiruchengode Vajravel, Bangalore (IN); Vishal Kumar Singh, East Singhbum (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/341,055

(22) Filed: Jun. 7, 2021

(51) Int. Cl.
*G06F 3/06* (2006.01)
*G06F 9/50* (2006.01)

(52) U.S. Cl.
CPC ............ *G06F 3/0631* (2013.01); *G06F 3/061* (2013.01); *G06F 3/0679* (2013.01); *G06F 9/5016* (2013.01)

(58) Field of Classification Search
CPC ...... G06F 3/061; G06F 3/0631; G06F 3/0647; G06F 3/0679

USPC .......................................................... 711/154
See application file for complete search history.

(56) References Cited

U.S. PATENT DOCUMENTS

| | | | | |
|---|---|---|---|---|
| 5,930,829 A * | 7/1999 | Little | .................... | G06F 12/023 711/170 |
| 9,128,942 B1 * | 9/2015 | Pfau | ........................ | G06F 16/13 |
| 9,311,375 B1 * | 4/2016 | Naik | ..................... | G06F 16/275 |
| 2009/0198946 A1 * | 8/2009 | Ebata | ...................... | G06F 3/067 711/E12.001 |
| 2012/0042115 A1 * | 2/2012 | Young | ................. | G06F 11/2076 711/6 |

* cited by examiner

*Primary Examiner* — Than Nguyen
(74) *Attorney, Agent, or Firm* — Kirton McConkie; Brian Tucker

(57) ABSTRACT

Memory usage can be optimized during an imaging process to enable larger-sized deployments and client servicing. A variety of components can be employed on a computing device to present a hybrid virtual volume to the operating system during an imaging process. The hybrid virtual volume will appear to the operating system as having a large size while consuming minimal amounts of memory and disk. As a result, the risk of the imaging process failing for lack of resources will be minimized even when the image is large.

20 Claims, 16 Drawing Sheets

OPTIMIZING MEMORY USAGE TO ENABLE LARGER-SIZED DEPLOYMENTS AND CLIENT SERVICING

CROSS-REFERENCE TO RELATED APPLICATIONS

N/A

BACKGROUND

Imaging (or re-imaging) is oftentimes used to configure computing devices with an operating system, various applications and settings. For example, an enterprise may deploy to its computing devices a golden image containing a customized version of the Windows operating system and a set of applications that its employees may use. Imaging (or servicing) is also oftentimes used to update computing devices.

When an image is deployed to a computing device, an imaging tool will typically use a reserved portion of the hard drive as temporary storage for the image. For example, the image may be in the form of a file, which is a highly compressed format, that can be downloaded and temporarily stored on the reserved portion of the hard drive. To avoid consuming excessive amounts of the hard drive, which is where the image will ultimately be written, the imaging tool will typically use a RAMDisk as a temporary directory for extracting files from the compressed image and possibly for applying any customizations to the files. However, the use of a RAMDisk for this temporary directory reduces the amount of RAM that will be available to perform the imaging process. For these reasons, imaging tools, such as Window RE, Windows PE and Microsoft Endpoint Manager, are typically configured to create a relatively small RAMDisk (e.g., 32 MB) for use during an imaging process.

In recent years, the average size of images has increased substantially. This is true of both new and recovery images and security patches, updates, hotfixes or other quick fix engineering (QFE) images. With this increase in image size, the imaging (or servicing) process more frequently fails due to a lack of resources. For example, it is not uncommon for the Apply-Image operation of the Deployment Image Servicing and Management command line tool to fail due to insufficient RAMDisk space. It is also not uncommon for a Windows update to fail due to insufficient space on the hard drive, particularly in thin client scenarios.

BRIEF SUMMARY

The present invention extends to methods, systems and computer program products for optimizing memory usage to enable larger-sized deployments and client servicing. A variety of components can be employed on a computing device to present a hybrid virtual volume to the operating system during an imaging process. The hybrid virtual volume will appear to the operating system as having a large size while consuming minimal amounts of memory and disk. As a result, the risk of the imaging process failing for lack of resources will be minimized even when the image is large.

In some embodiments, the present invention may be implemented as a method for optimizing resource usage during an imaging process. An I/O helper service can maintain an allocation bitmap and a location bitmap for a virtual volume. The virtual volume encompasses memory and a disk of a computing device. In response to a first I/O request that attempts to write a file to the virtual volume, the file can be stored on the virtual volume by writing the file to the memory. The allocation bitmap and the location bitmap can be updated to indicate that the file is stored in the memory.

In some embodiments, the present invention may be implemented as computer storage media storing computer executable instructions which when executed on a computing device implement a method for optimizing resource usage during an imaging process. A first I/O request may be received. The first I/O request may attempt to write a first file to a virtual volume. It can be determined that the first file should be written to the virtual volume by storing the first file on a disk of the computing device, rather than in memory of the computing device. In conjunction with storing the first file on the disk, a location bitmap can be updated to identify that the first file is stored on the disk rather than in memory.

In some embodiments, the present invention may be implemented as a method for optimizing resource usage during an imaging process. An allocation bitmap can be maintained. The allocation bitmap can define whether each of a plurality of logical cluster numbers of a virtual volume is allocated. A location bitmap can be maintained. The location bitmap can define whether allocated logical cluster numbers of the plurality of logical cluster numbers are allocated in memory or on disk. I/O requests can be handled using the allocation bitmap and the location bitmap.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
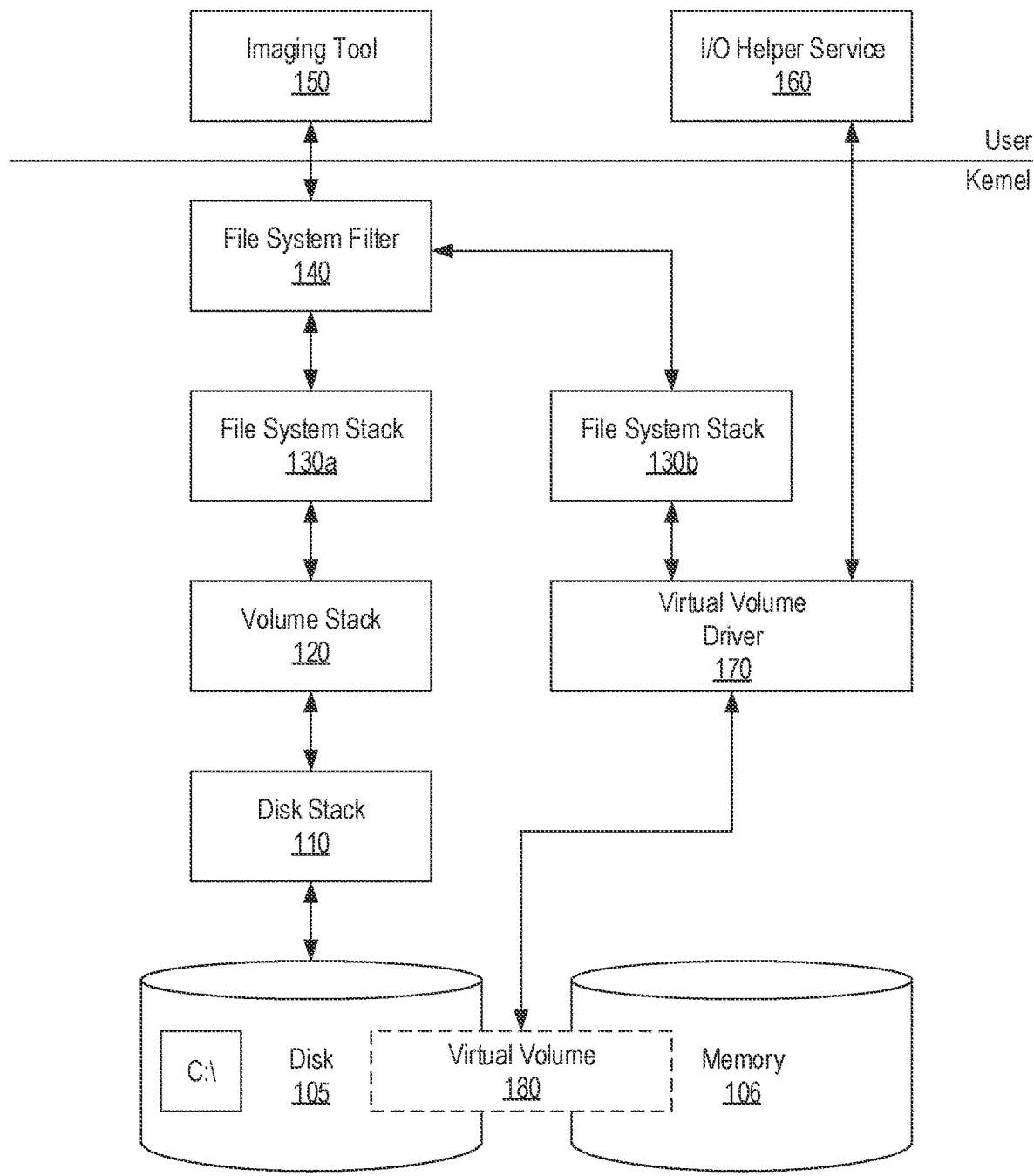
FIG. 1 provides an example of a computing architecture that may be employed on a computing device to implement one or more embodiments of the present invention.

FIG. 1 provides an example of a computing architecture that may be employed on a computing device to implement one or more embodiments of the present invention. As shown, a computing device may include a disk 105 and memory 106. A disk stack 110, volume stack 120 and file system stack 130a may be loaded to enable an imaging tool 150 (or other component) to read files from and write files to a volume that may exist on disk 105. In the context of embodiments of the present invention, this volume, which is assumed to be the C:\ volume hereafter, may typically include the operating system. For example, imaging tool 150 could write an image containing an operating system to the C:\ volume on disk 105 or could update the image already stored on the C:\ volume. Imaging tool 150 is intended to represent any application, service or other component that may perform an imaging process.

In accordance with one or more embodiments of the present invention, a file system filter 140, I/O helper service 160 and virtual volume driver 170 may also be installed on the computing device. File system filter 140 may be positioned above file system stack 130a so that it can process file system operations that target the file system on the C:\ volume before file system stack 130a receives such operations. Virtual volume driver 170 can function to create a virtual volume 180 which could span both disk 105 and memory 106 (i.e., a hybrid volume). File system stack 130b can provide access to a file system on virtual volume 180. As described in detail below, file system filter 140 may selectively route (e.g., reparse) file system operations that target the C:\ volume to virtual volume 180. As also described in detail below, I/O helper service 160 may interface with virtual volume driver 170 to manage virtual volume 180 including handling I/O requests that target virtual volume 180.

As introduced in the background, as part of an imaging process, imaging tool 150 will install a number of files to one or more directories on the C:\ volume. Typically, these files may be downloaded and temporarily stored (e.g., as part of a file) on a reserved volume on disk 105 and may be extracted and temporarily stored on a RAMDisk implemented in memory 106. File system filter 140, I/O helper service 160 and virtual volume driver 170 can interoperate in this context to ensure that a sufficient amount of disk 105 and memory 106 remains available throughout the imaging process to allow imaging tool 150 to complete the installation of the files to the C:\ volume, particularly in scenarios where the image may be large and/or when the size of disk 105 and/or memory 106 may be small.

FIGS. 2A-2E provide an example of functionality that may be performed prior to, or as part of, an imaging process to enable embodiments of the present invention to be implemented. For example, this functionality could be performed as part of booting into the Windows PE or Windows RE environments or at any other time or in any other environment in which imaging tool 150 may perform an imaging process.

Figure 2A:
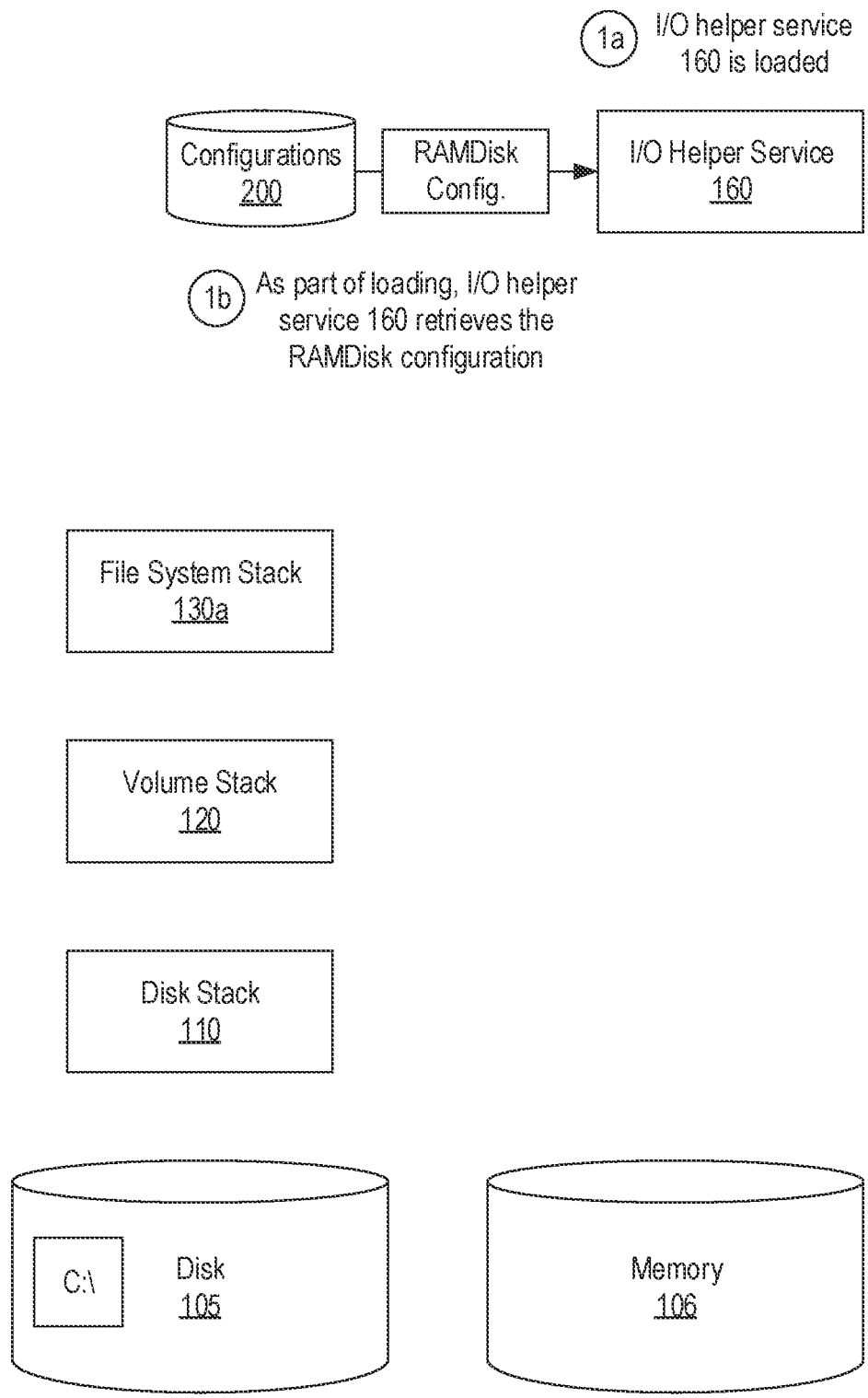
FIGS. 2A-2E provide an example of functionality that may be performed prior to, or as part of, an imaging process to enable embodiments of the present invention to be implemented.

Turning to FIG. 2A, it is assumed that the C:\ volume exists on disk 105 and that disk stack 110, volume stack 120 and file system stack 130a have been loaded. In step 1a, I/O helper service 160 is loaded. As part of loading, and in step 1b, I/O helper service 160 may access configurations 200 (which may be a data structure that is stored in any suitable manner on the computing device) to retrieve a RAIVIDisk configuration. This RAIVIDisk configuration can define configuration settings that I/O helper service 160 should use in creating a RAIVIDisk in memory 106. For example, the RAMDisk configuration may define the size of the RAIVIDisk and a consumption threshold, along with possibly other configuration settings or parameters. Although not shown, as part of step 1b, I/O helper service 160 may also delete any files or configuration settings that were used during a previous imaging process.

Figure 2B:
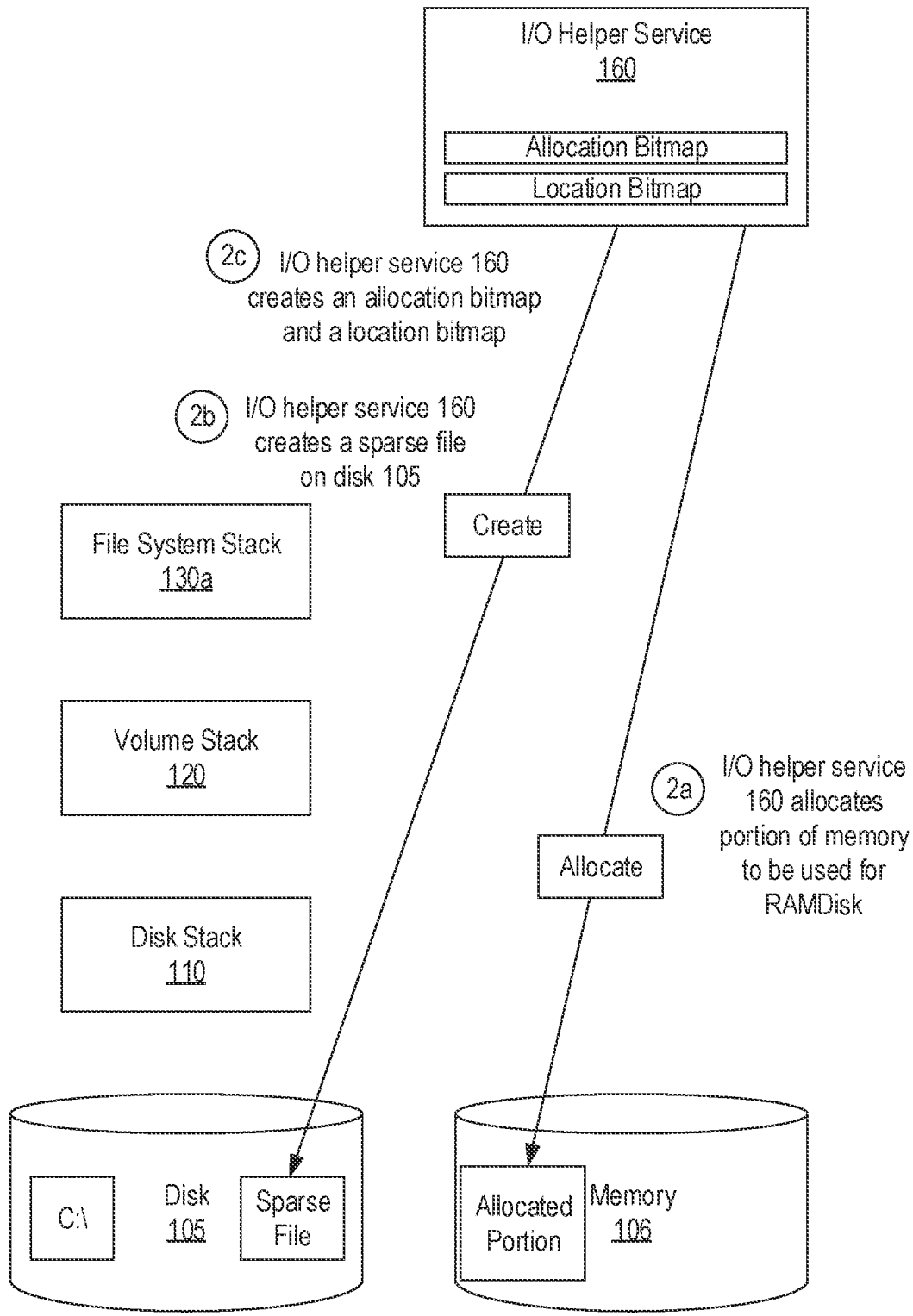

Turning to FIG. 2B, in step 2a, I/O helper service 160 can allocate a portion of memory 106 for use as the RAMDisk. The size of this portion may match the size specified in the RAMDisk configuration. This size may typically be a relatively small portion of memory 106 (e.g., 75 MB) to ensure that sufficient memory 106 remains available for other purposes. In step 2b, I/O helper service 160 may also create a sparse file on disk 105. As described below, the allocated portion of memory and the sparse file can be used to implement virtual volume 180. In step 2c, I/O helper service 160 can also create an allocation bitmap and a location bitmap which, as described below, it can use as part of implementing virtual volume 180. The allocation bitmap and the location bitmap could be stored in any accessible location on computing device such as on disk 105 or in memory 106, including on the Z:\ volume described below.

Figure 2C:
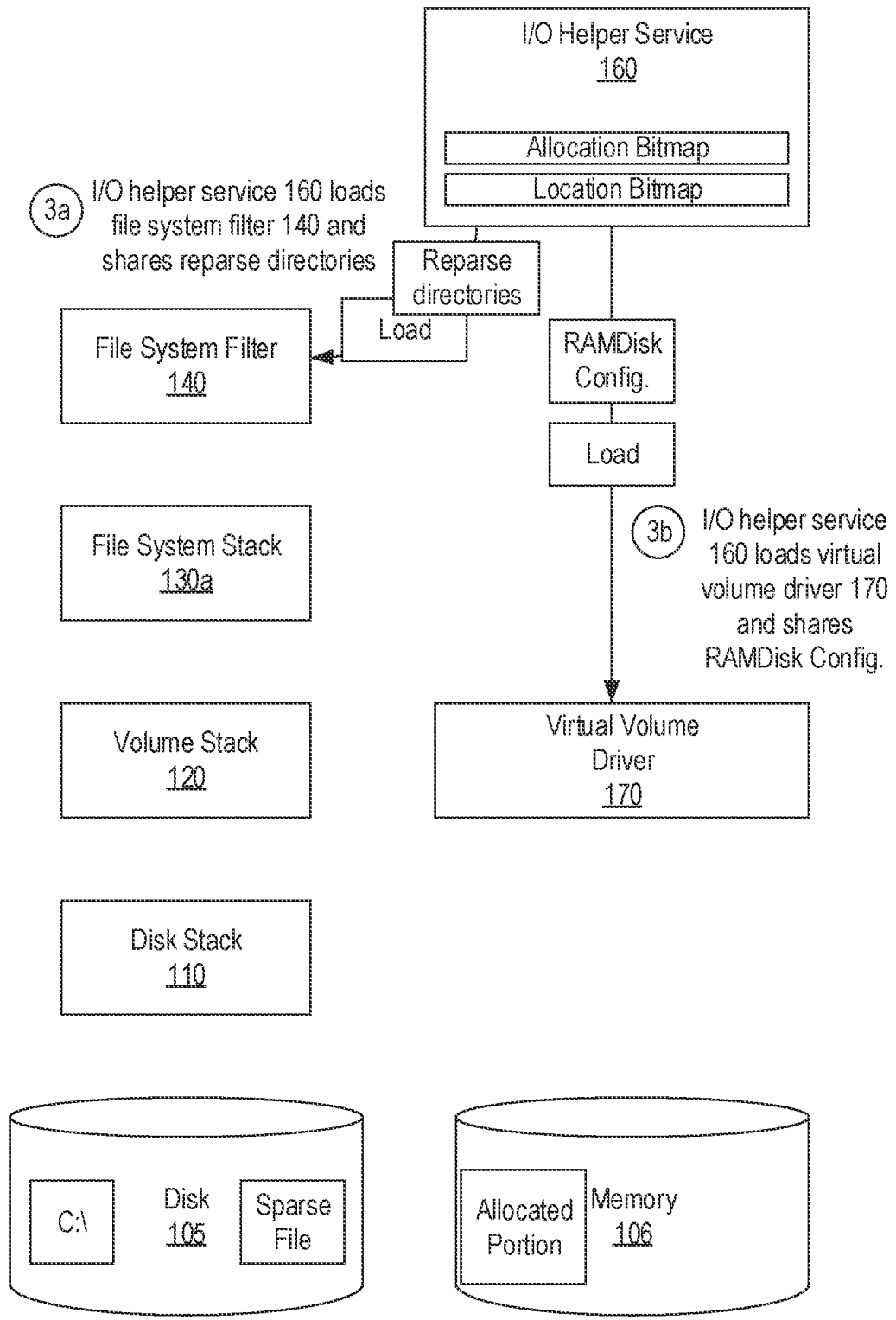

Turning to FIG. 2C, in step 3a, I/O helper service 160 can load file system filter 140 on top of file system stack 130a and can share one or more reparse directories with file system filter 140. These reparse directories can be directories that imaging tool 150 may be configured to use for temporary writes during an imaging process (e.g., a ScratchDir, a WinSxs directory, a DriverStore directory, etc.). In step 3b, I/O helper service 160 can load virtual volume driver 170 and share the RAIVIDisk configuration with it.

Figure 2D:
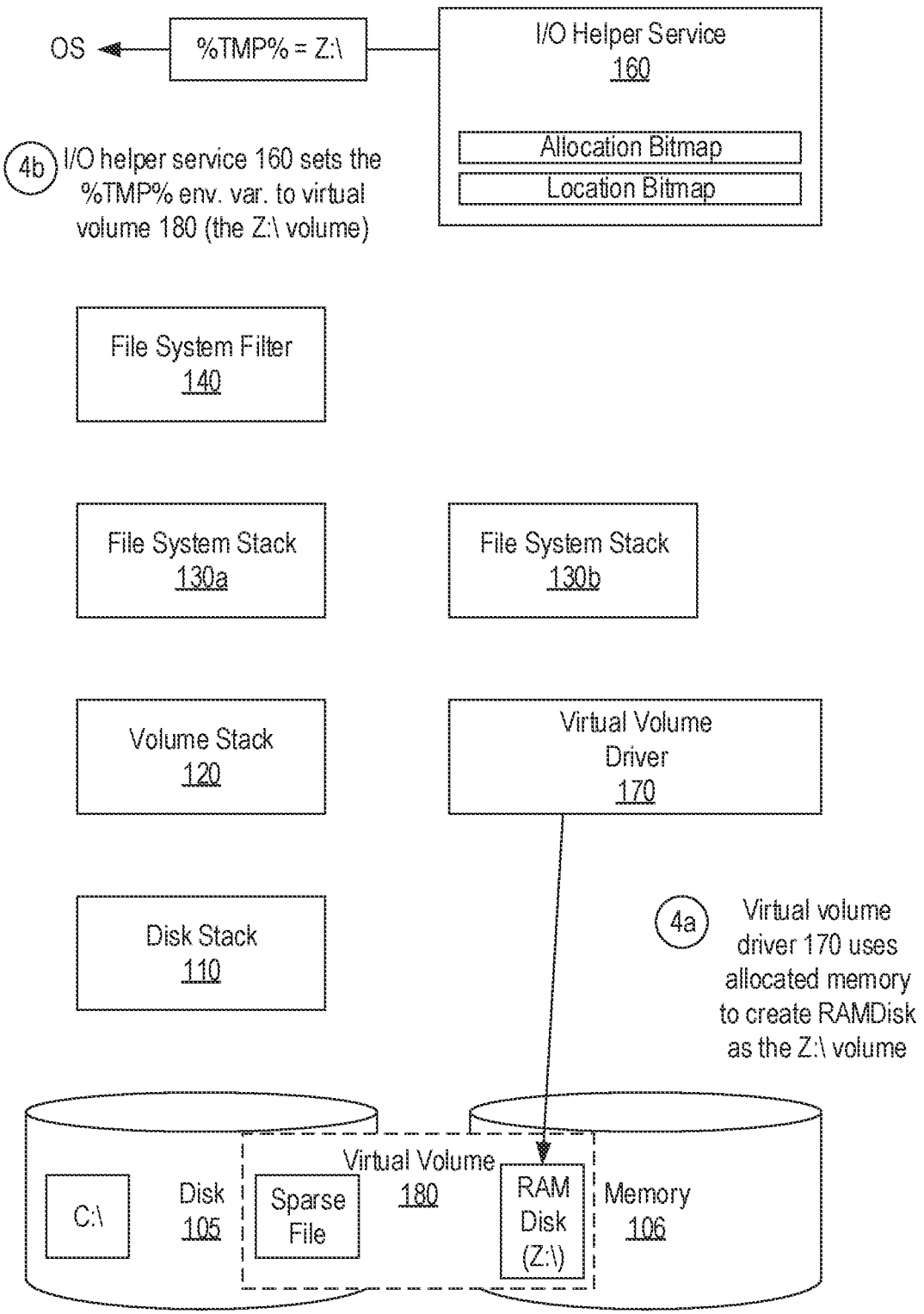

Turning to FIG. 2D, in step 4a, which may be performed as part of its loading, virtual volume driver 170 uses the allocated memory (e.g., as specified in the RAIVIDisk configuration shared in step 3b) to create a RAMDisk. For example, virtual volume driver 170 may create a symbolic link such as "\\Global??\Z:" to cause the RAMDisk to appear as the Z:\ volume on the computing device. Step 4a may also include the loading of file system stack 130b to enable other components, such as imaging tool 150, to access (e.g., write files to and read files from) the Z:\ volume. In step 4b, and with the Z:\ volume created, I/O helper service 160 can set the % TMP % environment variable to the Z:\ volume. This can cause imaging tool 150 to use the Z:\ volume for some I/O operations.

Figure 2E:
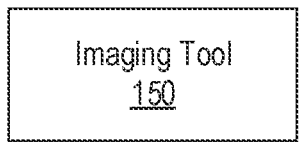
Figure 2E:
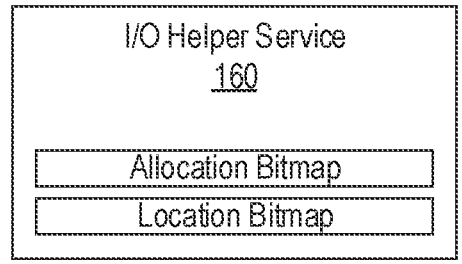
Figure 2E:
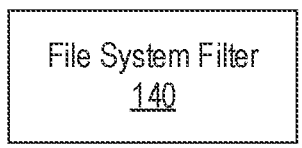
Figure 2E:
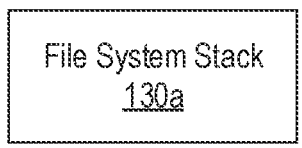
Figure 2E:
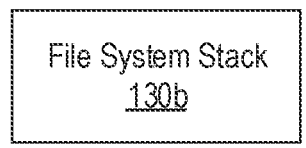
Figure 2E:
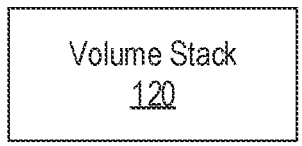
Figure 2E:
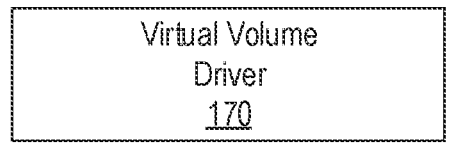
Figure 2E:
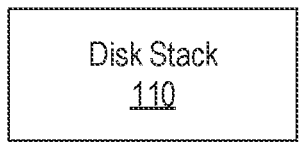
Figure 2E:
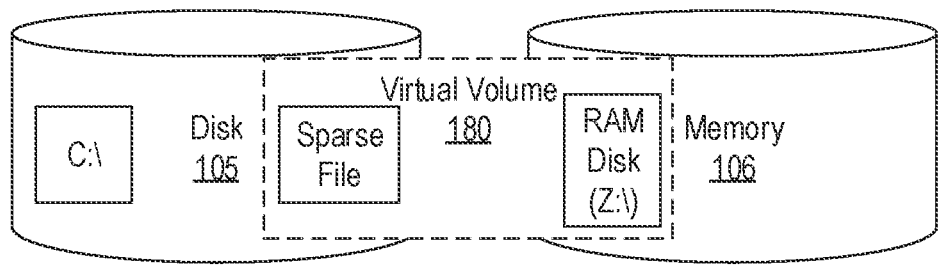

Turning to FIG. 2E, in step 5, it is assumed that imaging tool 150 is invoked to install an image to the C:\ volume. Due to the functionality represented in FIGS. 2A-2D, file system filter 140 will be able to intercept file system operations that target the C:\ volume, and particularly imaging tool 150's file system operations. Also, I/O helper service 160 and virtual volume driver 170 will be able to use the Z:\ volume in memory 106 (or whatever volume is created for the RAMDisk) and the sparse file on disk 105 to expose virtual volume 180 to imaging tool 150. Notably, I/O helper service 160 and virtual volume driver 170 can cause virtual volume 180 to appear and function as if it were much larger than the actual size of the Z:\ volume using the techniques described below. In other words, file system filter 140, I/O helper service 160 and virtual volume driver 170 can manage virtual volume 180 during the imaging process in a manner that can ensure that sufficient resources will remain available to complete the imaging process even in scenarios where the image is large and the computing device has limited resources.

Figure 3:
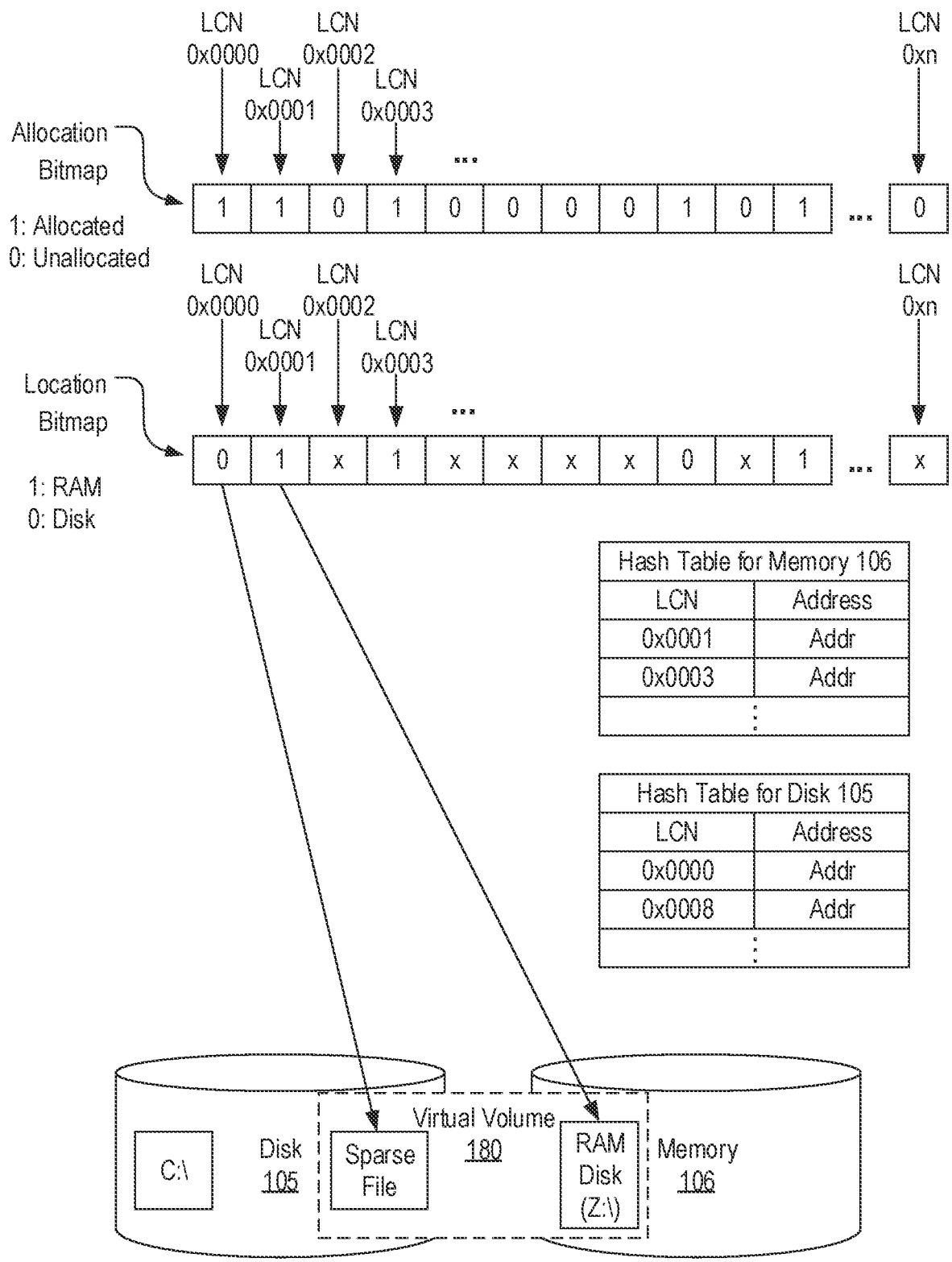
FIG. 3 provides an example of various files an I/O helper service may maintain in some embodiments of the present invention.

FIG. 3 provides an example of how the allocation bitmap and location bitmap may be structured. Each of these bitmaps may include a bit that corresponds to a logical cluster number of virtual volume 180. For example, the first bit may correspond with logical cluster number 0x0000, the second bit may correspond with logical cluster number 0x0001, etc. The bits in allocation bitmap define whether the respective logical cluster number is allocated on virtual volume 180 (i.e., whether content is currently stored at an address that is associated with the logical cluster number). In contrast, the bits in location bitmap define whether the respective logical cluster number maps to an address in memory 106 (e.g., on the Z:\ volume) or on disk 105 (e.g., in the sparse file). As described in detail below, I/O helper service 160 may set the bits of these bitmaps as part of handling I/O requests that target the Z:\ volume. In addition to maintaining these bitmaps, I/O helper service 160 may maintain a hash table for memory 106 that maps logical cluster numbers to particular addresses (e.g., pages) in memory 106 and a hash table for disk 105 that maps logical cluster numbers to particular addresses (e.g., pages) on disk 105. Accordingly, using the bitmaps and the hash tables, I/O helper service 160 can determine if a file, as represented by one or more logical cluster numbers, exists on virtual volume 180, and if so, where in memory 106 or on disk 105 the file is actually stored. Notably, these logical cluster numbers may be defined by file system stack 130*b* in a typical manner, but virtual volume driver 170 and I/O helper service 160 can use them in an atypical manner to implement virtual volume 180. In other words, virtual volume driver 170 and I/O helper service 160 hide from file system stack 130*b*, and therefore from imaging tool 150, the unique structure and functionality of virtual volume 180.

Figure 4A:
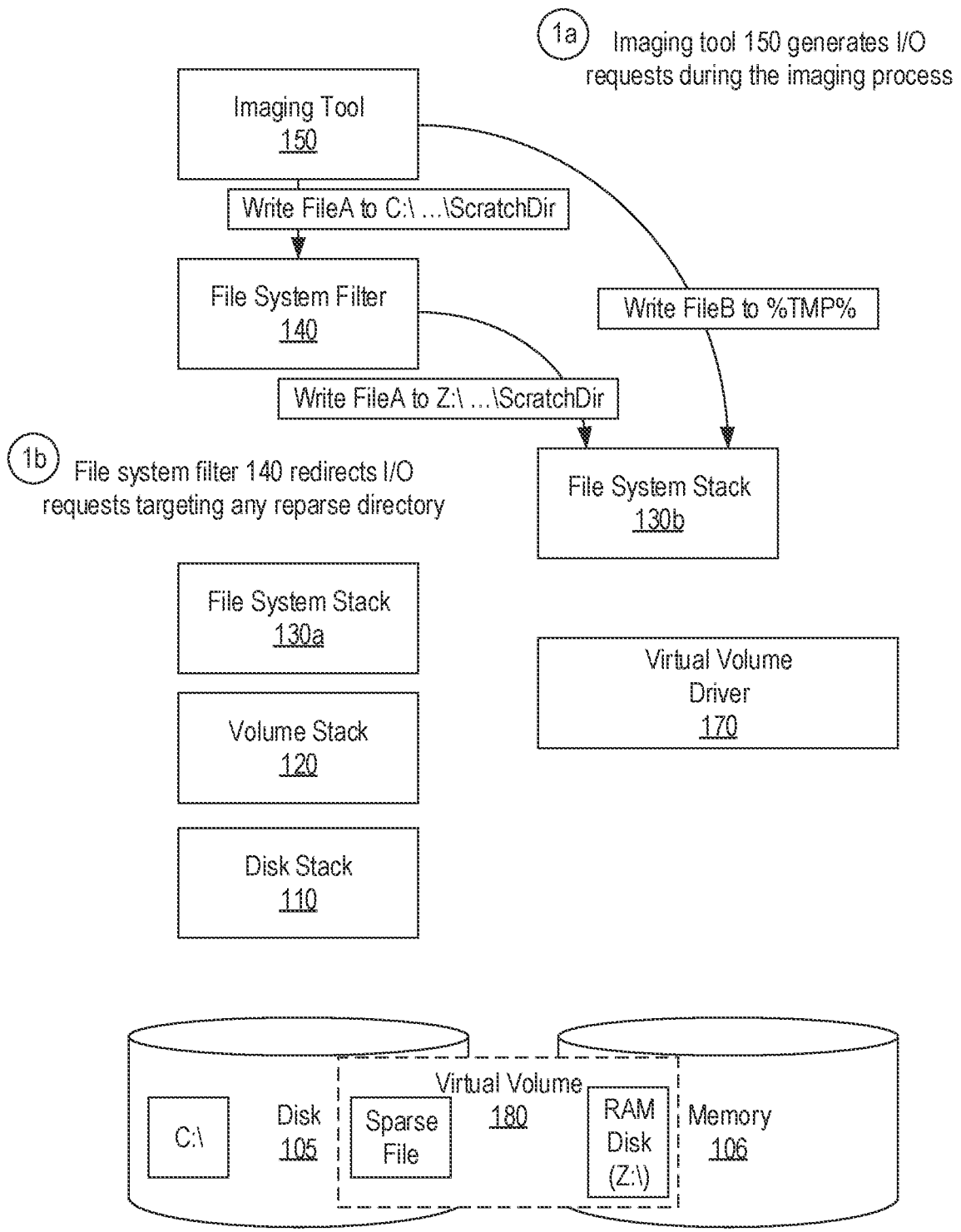
FIGS. 4A and 4B provide an example of how an I/O helper service and a virtual volume driver may interoperate to process I/O requests in some embodiments of the present invention.
Figure 4B:
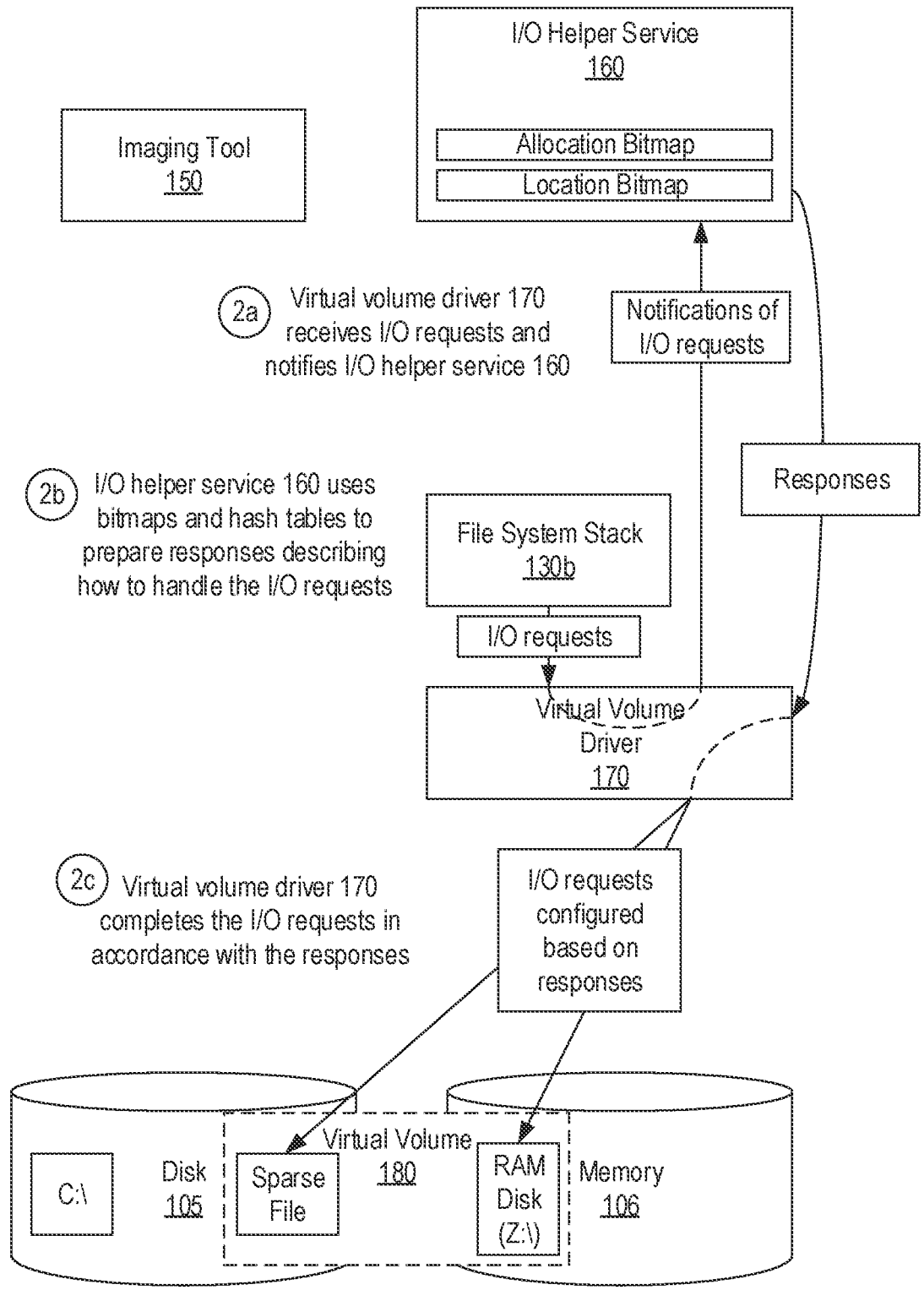

FIGS. 4A and 4B provide an overview of how some I/O requests may be handled in embodiments of the present invention. In step 1*a* shown in FIG. 4A, imaging tool 150 may generate I/O requests during the imaging process. For example, imaging tool 150 may attempt to read files from or write files to the C:\ volume or the volume associated with the % TMP % environment variable. Because I/O helper service 160 set the % TMP % environment variable to the Z:\ volume, imaging tool 150 may send some I/O requests directly to the Z:\ volume resulting in such I/O requests being passed directly to file system stack 130*b*. In contrast, any I/O request that targets the C:\ volume will be passed towards file system stack 130*a* but will be intercepted by file system filter 140. In step 1*b*, file system filter 140 may redirect any such I/O requests if they target a reparse directory as was specified in step 3*a* of FIG. 2C (e.g., I/O requests that target temporary directories such as the ScratchDir, the WinSxS directory, the DriverStore directory, etc.). If any such I/O request does not target a reparse directory, file system filter 140 can pass the I/O request down to file system stack 130*a* for handling in a typical fashion. Accordingly, in some embodiments, a primary function that file system filter 140 performs may be to reparse (or redirect) I/O requests that target temporary directories that are used during an imaging process.

Turning to FIG. 4B, after file system stack 130*b* has processed I/O requests it receives, it may pass them to virtual volume driver 170. At this stage, the I/O requests may define one or more logical cluster numbers (LCNs) to provide a relative location of the file on the Z:\ volume. For purposes of this description and the claims, the term LCN may be given its ordinary meaning such as an offset of a cluster (or portion of a file) relative to some arbitrary point within a volume. In step 2*a*, virtual volume driver 170 may send notifications of the I/O requests it receives to I/O helper service 160. These notifications could define the type of I/O (e.g., read or write), the LCN(s), and possibly many other parameters or characteristics of the I/O request.

In step 2*b*, for each I/O request, I/O helper service 160 can use the allocation and location bitmaps and the appropriate hash table to prepare a response that describes how virtual volume driver 170 should complete the I/O request using virtual volume 180. Then, in step 2*c*, virtual volume driver 170 can complete the I/O requests. Although not shown, virtual volume driver 170 may notify I/O helper service 160 of the completion of any I/O request to enable I/O helper service 160 to update the bitmaps, hash table or any other data structure appropriately.

Figure 5A:
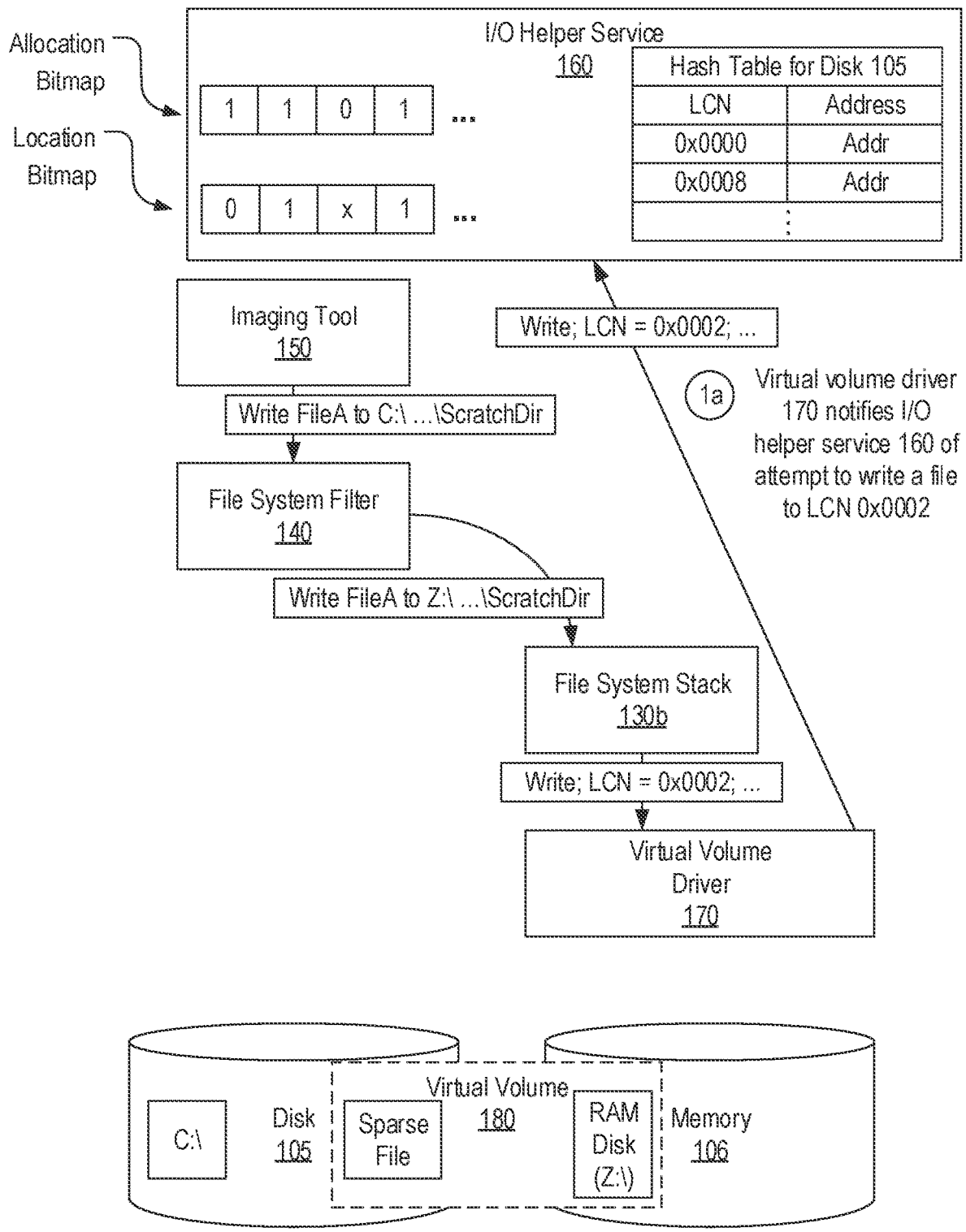
FIGS. 5A-5C provide an example of how a write request may be handled in some embodiments of the present invention.
Figure 5B:
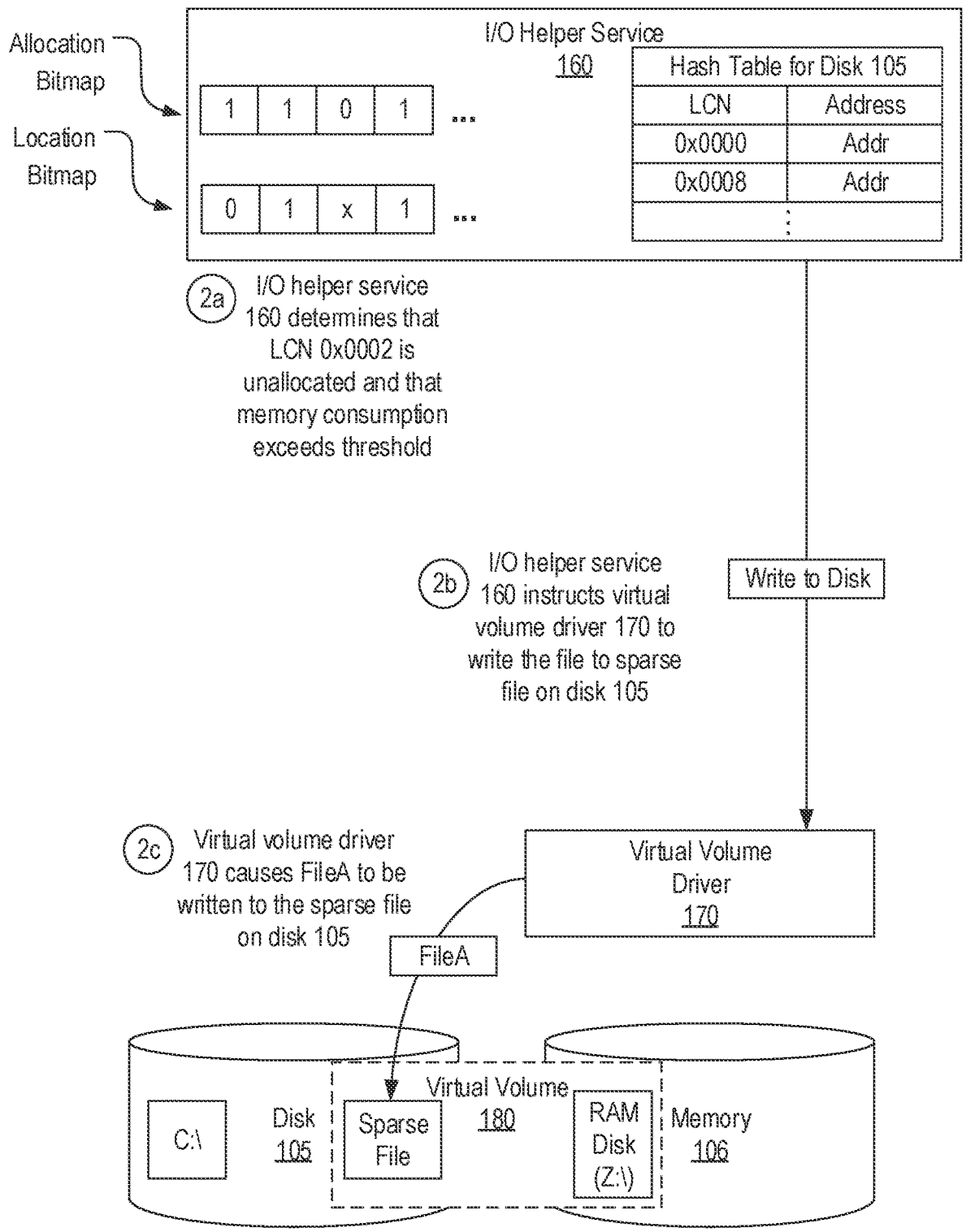
Figure 5C:
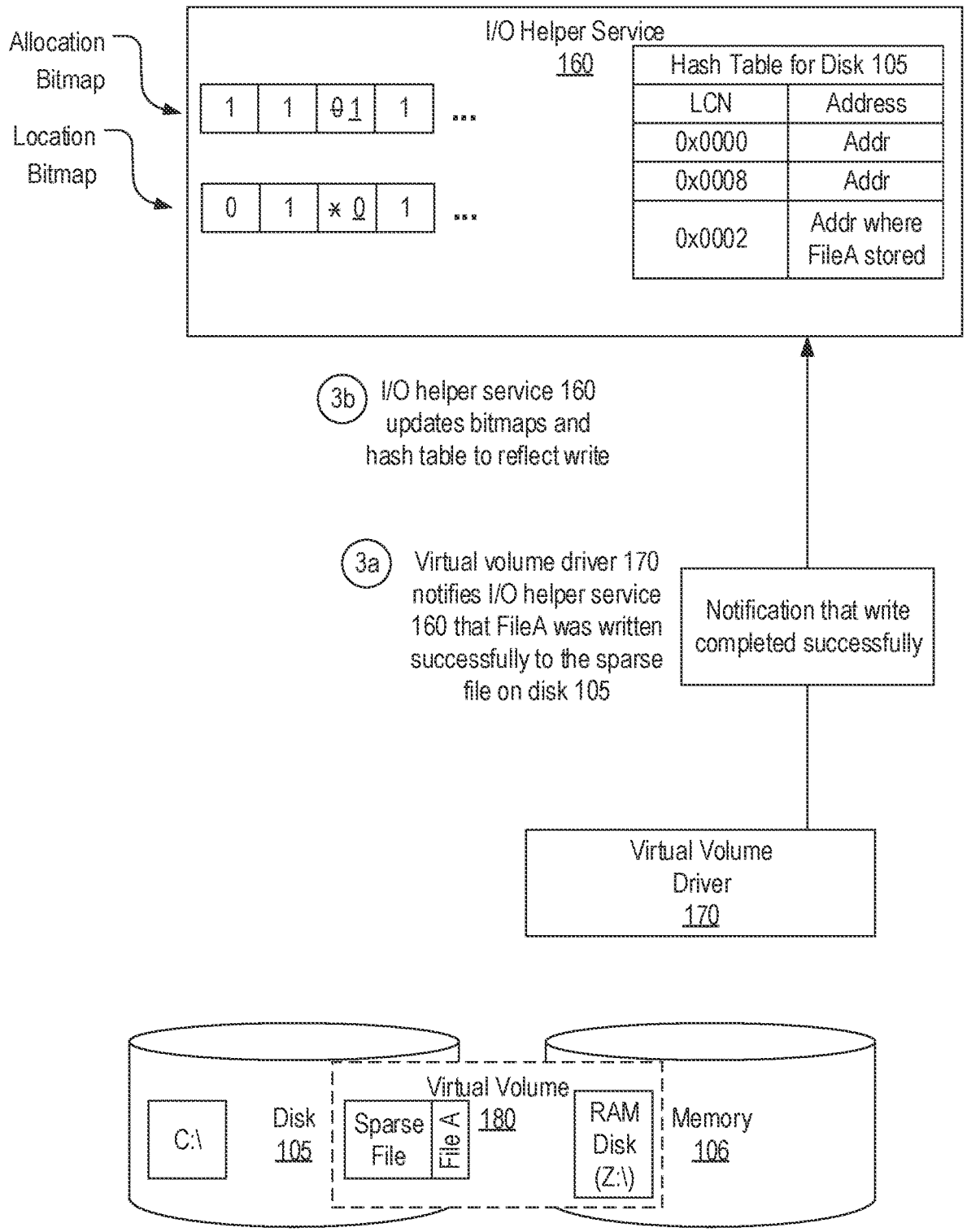

FIGS. 5A-5C provide an example of how a write may be handled in one or more embodiments of the present invention. In FIG. 5A, it is assumed that imaging tool 150 is performing an imaging process and has attempted to write FileA to the ScratchDir on the C: \ volume. As described above, file system filter 140 can reparse this write request so that it targets the Z:\ volume. After file system stack 130*b* processes the reparsed write request, it may be passed to virtual volume driver 170. At this stage, the write request may identify the LCN (or LCNs) where FileA should be written. Because the I/O request is a write request, virtual volume driver 170 can notify I/O helper service 160 in step 1*a*. Among possibly other things, this notification can identify the I/O request as a write request and can identify the LCN, which is assumed to be 0x0002.

Turning to FIG. 5B, in step 2*a* which is in response to the notification, I/O helper service 160 may determine that LCN 0x0002 is not allocated (e.g., because the third bit in the allocation bitmap is set to 0). Because the LCN is not allocated, I/O helper service 160 may determine whether the LCN should be allocated in memory 106 or on disk 105. For example, in some embodiments, I/O helper service 160 may allocate LCNs in memory 106 unless memory consumption exceeds a threshold (e.g., 60%). In this example, it is assumed that memory consumption exceeds the threshold and therefore, in step 2*b*, I/O helper service 160 may instruct virtual volume driver 170 to complete the write request by writing FileA to disk 105 rather than to memory 106. Then, in step 2*c*, virtual volume driver 170 may cause FileA to be written to disk 105. For example, virtual volume driver 170 may write FileA (e.g., by obtaining the content to be written from a buffer identified in the original write request) to a range in the sparse file that does not already have data (e.g., a range by which the sparse file was extended). In some embodiments, virtual volume driver 170 may identify which range in the sparse file a file should be written to, while in other embodiments, I/O helper service 160 may specify the range. In any case, after step 2*c*, FileA will be stored on disk 105—a fact that is abstracted from imaging tool 150.

Turning to FIG. 5C, in step 3*a*, virtual volume driver 170 can notify I/O helper service 160 that the write was completed successfully. Then, in step 3*b*, I/O helper service 160 may update the allocation bitmap, the location bitmap and the appropriate hash table. In this example, step 3*b* may include setting the bit for LCN 0x0002 in the allocation table to 1 (thereby indicating that the LCN is allocated on virtual volume 180), setting the bit for LCN 0x0002 in the location table to 0 (thereby indicating that LCN 0x0002 exists on disk 105) and adding/updating an entry to/in the hash table for disk 105 to associate LCN 0x0002 with an address defining where FileA was stored (which in this case would identify a location on disk 105 encompassed by the sparse file). Although not shown, in conjunction with performing steps 3*a* and 3*b*, virtual volume driver 170 can also complete the original write request thereby causing it to be passed back up to file system stack 130*b* and ultimately to imaging tool 150.

A similar process can be performed for a read request. For example, when I/O helper service 160 is notified of a read request, it can determine whether an LCN that the read request targets is allocated and, if so, whether it is in memory 106 or on disk 105. I/O helper service 160 can then use the appropriate hash table to obtain the address where the file to read is stored and instruct virtual volume driver 170 to read it. The read content can then be stored in a buffer identified in the original read request and the read request can be completed. Again, the fact that the file is stored on virtual volume 180, which may span memory 106 and disk 105, is abstracted from imaging tool 150.

The examples above have generally assumed that a file maps to a single LCN. However, in practice, this oftentimes will not be the case. An LCN may typically be 4 KB in size, and therefore some files may span many LCNs. In such cases, each LCN that a file may encompass could be allocated in either memory 106 or disk 105 using the techniques described above. For example, a file may encompass 10 LCNs where five of the LCNs exist in memory 106 and five of the LCNs exist on disk 105. Using the allocation and location bitmaps and the hash tables, I/O helper service 160 can dynamically allocate/locate such LCNs to thereby minimize the consumption of resources on the computing device.

I/O helper service 160 may also be configured to handle trim (or delete) I/O operations in a manner that minimizes the amount of resources that virtual volume 180 consumes. When virtual volume driver 170 notifies I/O helper service 160 of a trim operation (e.g., by specifying one or more LCNs that are to be trimmed), I/O helper service 160 can use the allocation bitmap, location bitmap and the appropriate hash table(s) to identify the addresses where the LCNs are stored in memory 106 or disk 105. For any LCN that is stored in memory 106, I/O helper service 160 can cause the LCN (or the page to which the LCN is mapped) to be freed. For any LCN that is stored on disk 105, I/O helper service 160 can cause the LCN (or the page to which the LCN is mapped) to be freed. For example, if the LCN is mapped to a portion of the sparse file, I/O helper service 160 can cause virtual volume driver 170 to send a FSCTL_SET_ZERO_DATA command to zero out the range that the LCN encompasses. By using the FSCTL_SET_ZERO_DATA command, the operating system may unallocate the range of the sparse file thereby reducing the amount of disk 105 that virtual volume 180 consumes.

Figure 6A:
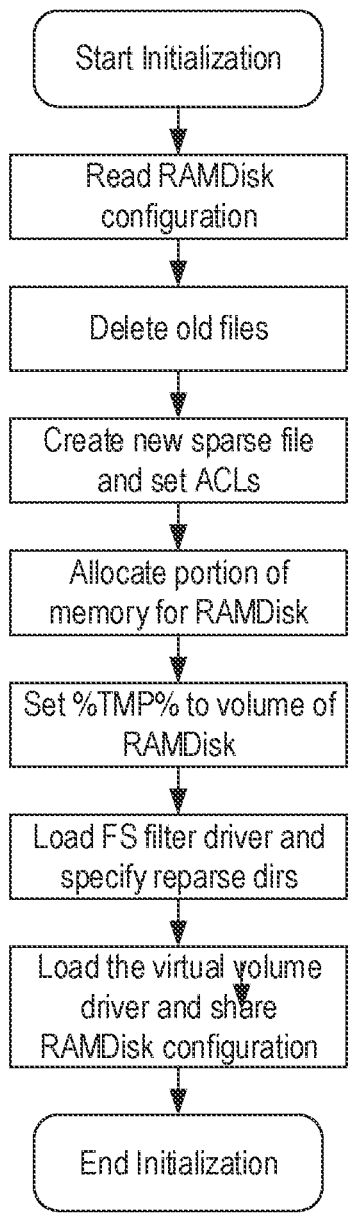
FIGS. 6A-6D provide flow diagrams representing functionality that can be performed in some embodiments of the present invention.
Figure 6B:
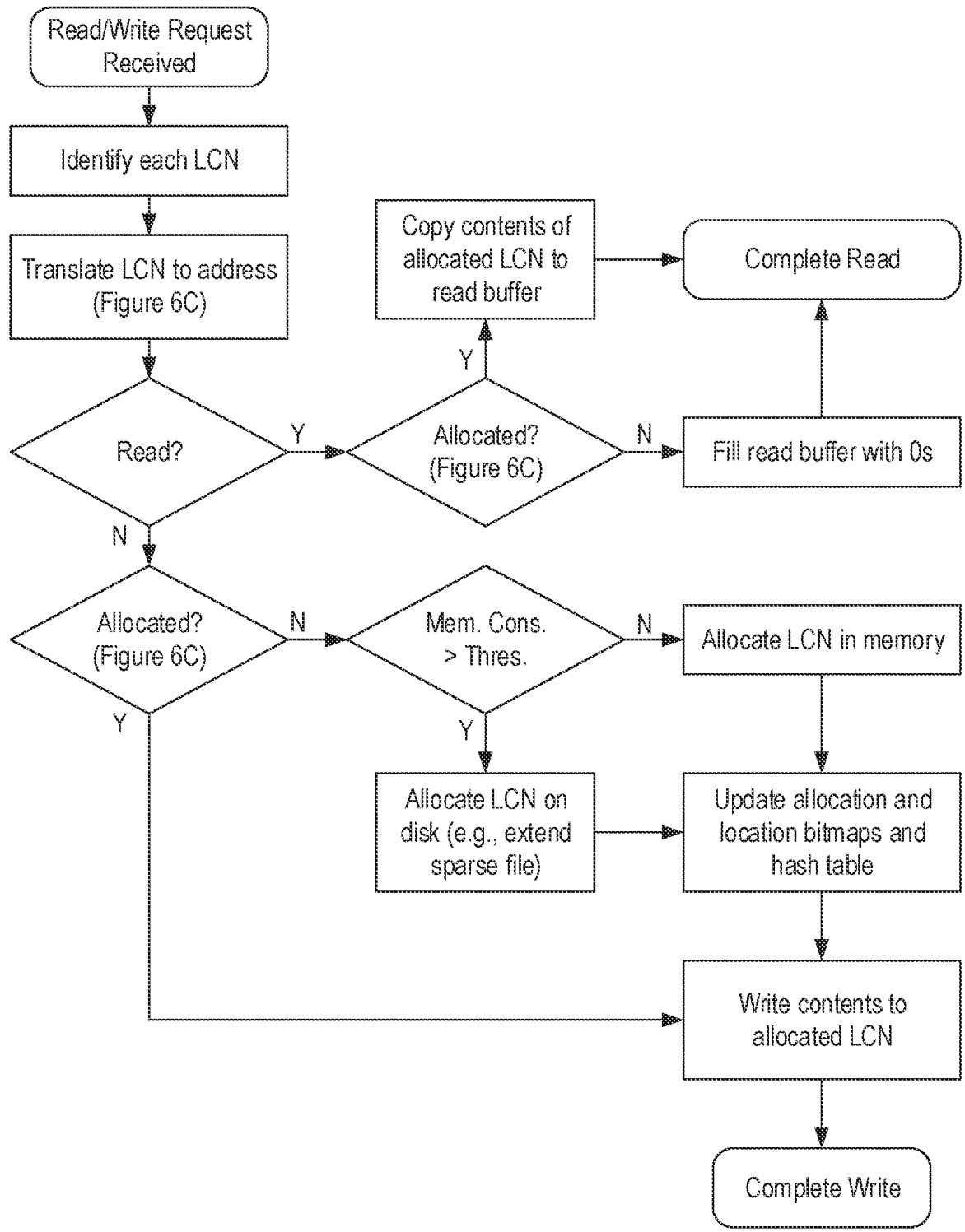
Figure 6C:
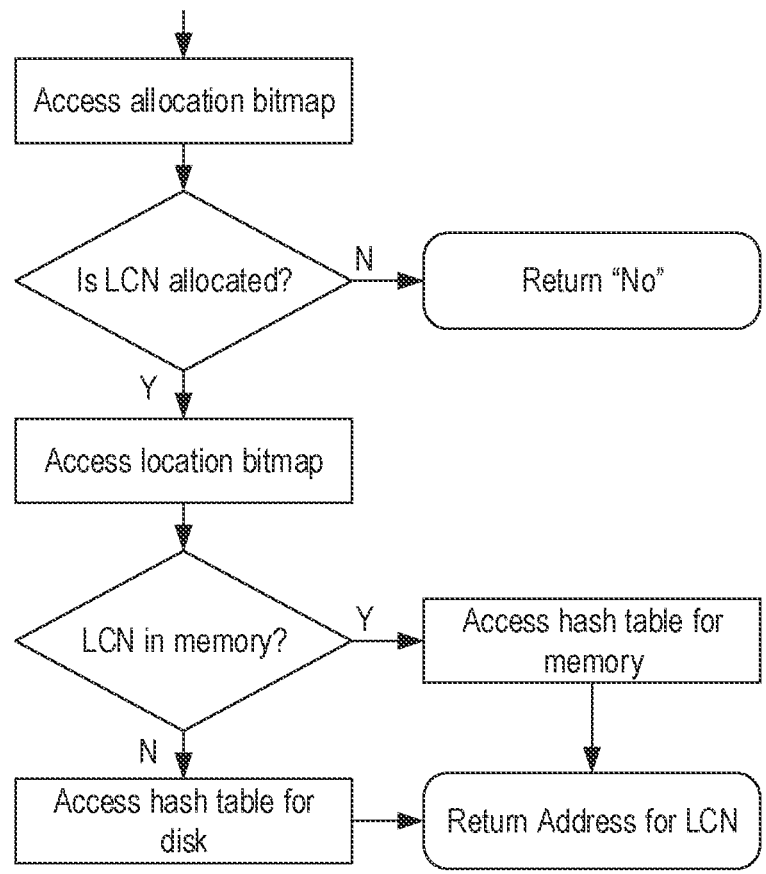
Figure 6D:
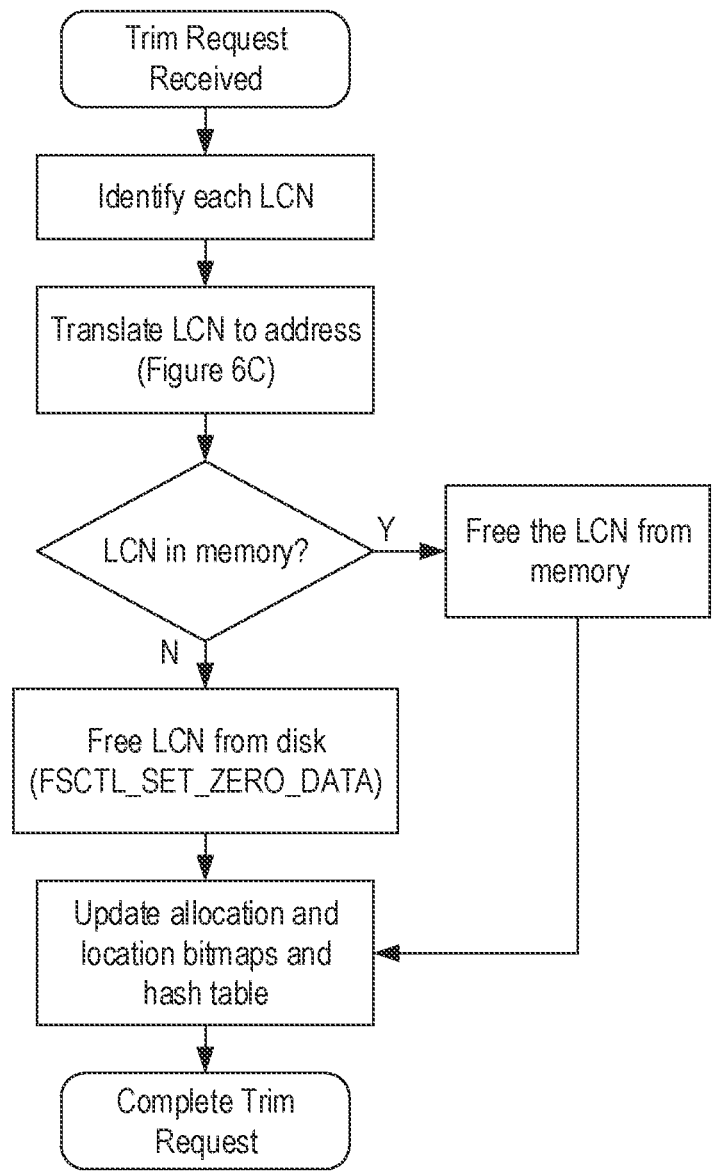

FIGS. 6A-6D provide flow diagrams representing functionality that can be performed in embodiments of the present invention. FIG. 6A represents functionality that I/O helper service 160 can perform as part of its initialization. FIG. 6B represents functionality that I/O helper service 160, in conjunction with virtual volume driver 170, can perform to handle a read or write request. FIG. 6C represents functionality that I/O helper service 160, in conjunction with virtual volume driver 170, can perform to determine if and how a LCN is allocated. FIG. 6D represents functionality that I/O helper service 160, in conjunction with virtual volume driver 170, can perform to handle a trim request.

In summary, embodiments of the present invention can be implemented to minimize the amount of resources that are consumed during an imaging process. When embodiments of the present invention are implemented, larger images can be installed on a computing device without the risk that the computing device will run out of resources during the imaging process.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for optimizing resource usage during an imaging process, the method comprising:
   maintaining, by an I/O helper service, an allocation bitmap and a location bitmap for a virtual volume, the virtual volume encompassing memory and a disk of a computing device, the allocation bitmap and the location bitmap each including bits that correspond with logical cluster numbers of the virtual volume;
   in response to a first I/O request that attempts to write a file to the virtual volume, causing the file to be stored on the virtual volume by writing the file to the memory; and
   updating the allocation bitmap and the location bitmap to indicate that the file is stored in the memory.

2. The method of claim 1, wherein updating the allocation bitmap and the location bitmap to indicate that the file is stored in the memory comprises setting a first bit in the allocation bitmap, the first bit in the allocation bitmap corresponding with a first logical cluster number of the virtual volume.

3. The method of claim 2, wherein updating the allocation bitmap and the location bitmap to indicate that the file is stored in the memory further comprises setting a first bit in the location bitmap, the first bit in the location bitmap corresponding with the first logical cluster number of the virtual volume.

4. The method of claim 3, further comprising:
creating a mapping between the first logical cluster number and a particular address in the memory where the file is stored.

5. The method of claim 4, wherein the mapping is created in a hash table.

6. The method of claim 3, further comprising:
in response to a second I/O request that attempts to read the file, accessing the allocation bitmap and the location bitmap to determine that the file is stored in the memory.

7. The method of claim 4, further comprising:
in response to a second I/O request that attempts to read the file, accessing the allocation bitmap and the location bitmap to determine that the file is stored in the memory; and
accessing the mapping to determine that the file is stored in the memory at the particular address.

8. The method of claim 7, further comprising:
reading content of the file stored in the memory at the particular address to complete the second I/O request.

9. The method of claim 1, further comprising:
in response to a second I/O request that attempts to write a second file to the virtual volume, causing the second file to be stored on the virtual volume by writing the second file to the disk; and
updating the allocation bitmap and the location bitmap to indicate that the second file is stored on the disk.

10. The method of claim 9, wherein the second file is stored in a sparse file on the disk.

11. The method of claim 9, wherein the second file is caused to be stored on the virtual volume by writing the second file to the disk in response to determining that consumption of the memory exceeds a threshold.

12. The method of claim 9, further comprising:
in response to a third I/O request that attempts to delete the second file from the virtual volume, accessing the allocation bitmap and the location bitmap to determine that the second file is stored on the disk;
determining that the second file is stored on the disk at a particular address; and
freeing the particular address on the disk.

13. The method of claim 12, wherein freeing the particular address on the disk comprises issuing an FSCTL_SET_ZERO_DATA command.

14. The method of claim 1, further comprising:
reparsing the first I/O request.

15. One or more computer storage media storing computer executable instructions which when executed on a computing device implement a method for optimizing resource usage during an imaging process, the method comprising:

maintaining an allocation bitmap and a location bitmap for a virtual volume, the virtual volume encompassing memory and a disk of a computing device, the allocation bitmap and the location bitmap each including bits that correspond with logical cluster numbers of the virtual volume;
receiving a first I/O request that attempts to write a first file to the virtual volume;
determining that the first file should be written to the virtual volume by storing the first file on the disk of the computing device, rather than in the memory of the computing device; and
in conjunction with storing the first file on the disk, updating the location bitmap to identify that the first file is stored on the disk rather than in memory.

16. The computer storage media of claim 15, wherein the method further comprises:
in conjunction with updating the location bitmap, mapping an address representing where the first file is stored on the disk to a logical cluster number of the first file.

17. The computer storage media of claim 16, wherein the method further comprises:
receiving a second I/O request that attempts to read the first file on the virtual volume;
accessing the location bitmap to determine that the first file is stored on the disk;
accessing the mapping to obtain the address; and
reading the first file using the address.

18. The computer storage media of claim 17, wherein the first file is stored as part of a sparse file on the disk.

19. The computer storage media of claim 18, wherein the method further comprises:
receiving a third I/O request that attempts to delete the first file from the virtual volume;
accessing the location bitmap to determine that the first file is stored on the disk;
accessing the mapping to obtain the address; and
deleting the first file by causing a range of the sparse file to be filled with zeros, the range being defined by the address.

20. A method for optimizing resource usage during an imaging process, the method comprising:
maintaining an allocation bitmap and a location bitmap for a virtual volume, the virtual volume encompassing memory and a disk of computing device, the allocation bitmap and the location bitmap each including bits that correspond with logical cluster numbers of the virtual volume;
setting the bits in the allocation bitmap to define whether each of the plurality of logical cluster numbers of the virtual volume is allocated;
setting the bits in the location bitmap to define whether allocated logical cluster numbers of the plurality of logical cluster numbers are allocated in memory or on disk; and
handling I/O requests using the allocation bitmap and the location bitmap.

* * * * *